United States Patent [19]

Swindlehurst

[11] Patent Number: 4,635,874

[45] Date of Patent: Jan. 13, 1987

[54] SEAT BELT RETRACTOR

[75] Inventor: James A. Swindlehurst, Fraser, Mich.

[73] Assignee: General Motors Corporation, Detroit, Mich.

[21] Appl. No.: 808,082

[22] Filed: Dec. 12, 1985

[51] Int. Cl.$^4$ ........................ B60R 22/38; B65H 75/48
[52] U.S. Cl. .............................................. 242/107.4 B
[58] Field of Search ................. 242/107.4 B, 107.4 D, 242/107.4 A

[56] References Cited

U.S. PATENT DOCUMENTS

| Re. 29,594 | 3/1978 | Takada et al. | 242/107.4 B |
|---|---|---|---|
| 3,450,368 | 6/1969 | Glauser et al. | 242/107.4 B |
| 3,482,799 | 12/1969 | Wrighton et al. | 242/107.4 B |
| 3,510,085 | 5/1970 | Stoffel | 242/107.4 B |
| 3,632,058 | 1/1972 | Stoffel | 242/107.4 B |
| 3,862,726 | 1/1975 | Ulrich et al. | 242/107.4 B |
| 3,999,723 | 12/1976 | Magyar | 242/107.4 D |
| 4,053,116 | 10/1977 | Takada | 242/107.7 |
| 4,386,745 | 6/1983 | Patel et al. | 242/107.4 B |
| 4,585,186 | 4/1986 | Izuchi et al. | 242/107.4 D |
| 4,586,678 | 5/1986 | Saito | 242/107.4 D |

Primary Examiner—Stuart S. Levy
Assistant Examiner—Katherine A. Matecki
Attorney, Agent, or Firm—Charles E. Leahy

[57] ABSTRACT

A seat belt retractor includes a reel rotatably mounted on the frame side walls and having toothed plates disposed adjacent to the side walls and a belt wound on the reel to a diameter greater than the toothed plates. A lock bar extending between the side walls is movable from a rest position spaced away from the toothed plates to a locking position engaging one of the sprocket teeth subsequent to the unwinding of sufficient belt from the reel to decrease the belt diameter to a diameter less than the diameter of the sprocket teeth. A sensor pawl eccentrically mounted on the reel flies out into engagement with inside clutch teeth of an annular clutch member, an annular split clutch ring encircles the outer surface of the annular clutch member and has an actuating arm which actuates the lock bar. The split clutch ring has fingers which seat into teeth provided on the outer surface annular clutch member. These teeth on the inner and outer surfaces are equal in number with the sprocket teeth and angularly related therewith to assure full engagement of the lock bar with the sprocket teeth. If an occupant unwinds the belt from the retractor at a high rate of speed which would initiate retractor lockup before the belt has been sufficiently unwound to expose the toothed plates for engagement by the lock bar, the clutch spring will provide a measured incremental slippage of the locking mechanism to permit continued belt unwinding while still maintaining the desired timing relationship between the sensor mechanism and the lock bar.

1 Claim, 3 Drawing Figures

SEAT BELT RETRACTOR

The invention relates to a seat belt retractor and more particularly relates to a locking mechanism sensitive to rotary acceleration and having a slip clutch therein effective to slip and thereby delay retractor lockup until sufficient belt has been unwound from the reel to enable the lock bar to engage with the toothed plates carried by the reel.

BACKGROUND OF THE INVENTION

Seat belt retractors routinely have a belt reel which is journaled for rotation on a housing and a winding spring for urging rotation of the reel in the direction to wind the belt to a stored condition on the reel. The reel conventionally carries a toothed plate at each end thereof. A lock bar is pivotally mounted on the laterally spaced apart side walls of the housing and is movable by an inertia sensing mechanism into engagement with the sprocket teeth of the toothed plates to lock the belt reel against belt unwinding rotation.

In modern motor vehicles, it is desirable to make seat belt retractors as small and as light as possible. Thus, in the interest of reducing the size and weight of the retractor, it is desirable to reduce the diameter of the toothed plates which are carried by the reel and comprise a part of the retractor locking mechanism. As a result, when the belt is fully wound on the reel, the belt may be wound up to a diameter greater than the diameter of the sprocket teeth on the toothed plates so that the presence of the belt will block the movement of a lock bar into engagement with the toothed plates.

The locking mechanism employed in such seat belt retractors may be of the type including a sensing mechanism which is responsive to the rate of belt unwinding from the reel. Such a belt sensitive locking mechanism typically includes a pawl or weight which is eccentrically mounted on the reel and flies outwardly into engagement with clutch teeth of an annular clutch in response to the occurrence of a predetermined rate of belt unwinding reel rotation. The annular clutch is in turn coupled with the lock bar in a manner by which rotation of the annular clutch by the pawl will actuate the lock bar into locking engagement with the toothed plates carried by the reel.

The prior art has recognized that the teeth on the toothed plates carried by the reel and the teeth on the annular clutch should be equal in number and angularly related with each other so that the lock bar will fully engage with the sprocket teeth carried by the reel to carry the occupant restraint load and thereby prevent any further unwinding rotation of the reel and the pawl carried thereby so that the pawl and the annular clutch will not be subjected to the load occupant restraint.

The prior art has also recognized that the drive coupling arrangement between the annular clutch and lock bar may be provided by a split annular clutch ring which frictionally grips the annular clutch and will slip to forgive any delay in the locking of the lock bar with the sprocket teeth carried by the reel so that the pawl and annular clutch will not be overloaded. However, a disadvantage of such a slip clutch is that such slippage of the clutch upsets the angular relation between the clutch teeth of the annular clutch member and the sprocket teeth carried by the reel.

SUMMARY OF THE INVENTION

The present invention provides a new and improved seat belt retractor in which the frame has spaced apart side walls and a reel rotatably mounted on the side walls. The reel has toothed plates disposed adjacent to the side walls and a belt wound upon the reel to a diameter greater than the diameter of sprocket teeth on the toothed plates. A lock bar extends between the side walls and is movable from a rest position spaced away from the toothed plates to a locking position engaging one of the sprocket teeth subsequent to the unwinding of sufficient belt from the reel to decrease the belt diameter to a diameter less than a diameter of the sprocket teeth. Retractor lockup is initiated by a sensor pawl which is eccentrically mounted on the end of the reel to fly out into engagement with inside clutch teeth of an annular clutch member and rotate the annular clutch member to carry an actuating arm thereof into engagement with the lock bar and actuate the lock bar into engagement with the toothed plates carried by the reel. The actuating arm is provided on a split annular clutch ring which encircles the outer cylindrical surface of the annular clutch member and has fingers which seat into teeth provided on the outer surface of the annular clutch member. These teeth on the outer surface of the annular clutch member are equal in number with the teeth on the inside of the annular clutch member and the sprocket teeth of the toothed plates and are angularly related therewith in a manner to obtain full engagement of the lock bar with the sprocket teeth. However, in the event that such full engagement is not obtained, the split clutch ring fingers will slip on the annular clutch member in measured increments determined by the spacing of the teeth on the outer surface of the annular clutch member. Accordingly, in the event that an occupant donning the seat belt unwinds the belt from the retractor at a high rate of speed which would initiate retractor lockup before the belt has been sufficiently unwound from the reel to expose the sprocket teeth of the toothed plates for engagement by the lock bar, the clutch spring will provide a measured incremental slippage of the locking mechanism to permit continued belt unwinding while still maintaining the desired timing relationship between the sensor mechanism and the lock bar.

Thus, it is seen that the invention provides a new and improved belt rotation sensitive locking device in which the acceleration sensor is friction drive coupled with the lock bar by an incremental stepping friction clutch which employs increments of clutching action equal in number to the number of ratchet teeth on the reel and the number of ratchet teeth in the pawl-clutch acting between the reel and the actuating member so that the timing of the sensing mechanism is reliably maintained even after the clutch slip ring functions to retard the lock up of the reel until after the extent of belt winding has been sufficient to unblock the lock bar for locking engagement with the reel teeth.

BRIEF DESCRIPTION OF THE DRAWINGS

These and other features, objects and advantages of the invention will become apparent upon consideration of the following description and the appended drawings in which.

DESCRIPTION OF THE PREFERRED EMBODIMENT

Figure 1:
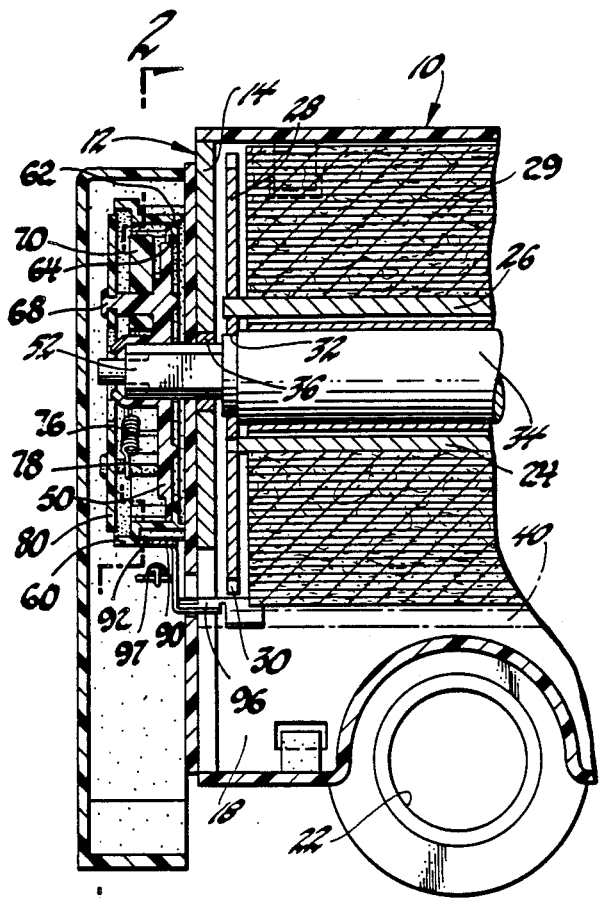
FIG. 1 is a frontal elevation view showing a retractor according to the invention having parts broken away and in section.

Referring to FIG. 1, a seat belt retractor generally indicated at 10 includes a stamped steel frame 12 having laterally spaced apart side walls, one of which is shown at 14, and integrally connected by a base wall 18. The base wall 18 has a T-shaped projection 20 which projects therefrom and is adapted to fit into a receptacle in the pillar of the motor vehicle body, not shown. The base wall 18 also has an apertured boss 22 for receiving a bolt to attach the base wall 18 to the vehicle pillar.

A belt reel, generally indicated at 24, includes a spool 26 comprised of a sheet metal stamping having its ends staked to toothed plates, one of which is shown at 28. The belt 29 is suitably attached to the spool 26. Each of the toothed plates have a plurality of circumferentially spaced sprocket teeth 30 which face in the belt unwinding direction of rotation. The toothed plate 28 has a central aperture 32 which receives a reel shaft 34. The reel shaft extends through a bushing 36 mounted in an aperture of the side wall 14. The other end of the reel shaft 34 is similarly mounted in the other end wall of the retractor and a spiral spring acts between that end of the reel shaft 34 and the housing. Thus, the reel is journaled for rotation in the belt winding and unwinding directions of rotation and the spiral spring urges such rotation in the winding direction.

Figure 2:
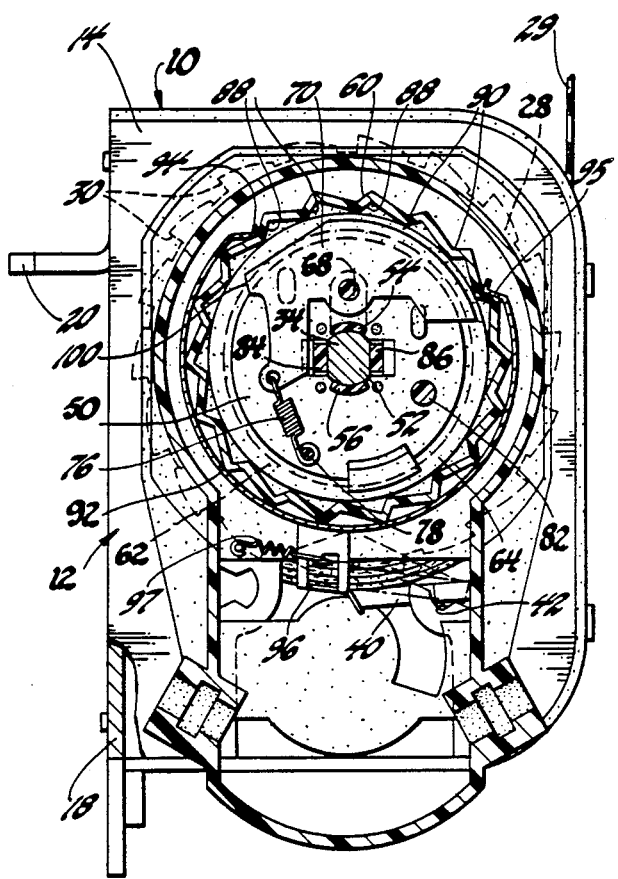
FIG. 2 is a sectional view taken in the direction of arrows 2—2 of FIG. 1.

A lock bar 40 has its ends respectively mounted in mounting apertures provided in the side walls of the housing in order to mount the lock bar 40 for pivotal movement into locking engagement with the sprocket teeth 30. In particular, FIGS. 1 and 2 show the end of the lock bar 40 extending into a bow-tie shaped aperture 42 provided in the housing side wall 14. The other end of the lock bar 40 is similarly mounted.

Figure 3:
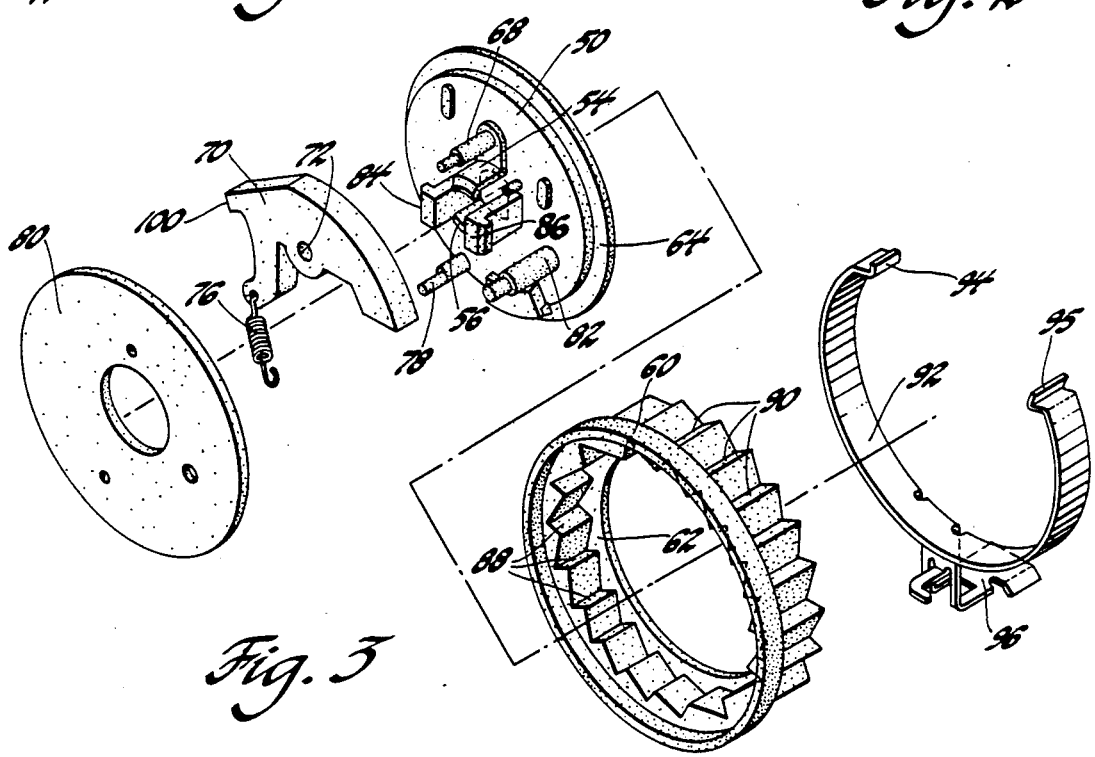
FIG. 3 is an exploded perspective view showing the elements of the sensor mechanism of the retractor.

A sensing mechanism is provided for selectively moving the lock bar 40 into engagement with the sprocket teeth 30. As seen in FIGS. 1, 2, and 3, a molded plastic reel extension 50 is fixedly attached to a necked-down extended end 52 of the reel shaft 34 by spring fingers 54 and 56. A cup-shaped annular clutch member 60 has an annular flange 62 which seats beneath a flange 64 of the reel extension 50 to journal the annular clutch member 60 for rotary movement relative to the reel extension 50. The reel extension 50 includes a pivot pin 68 which pivotally mounts a pawl 70 having an aperture 72 which seats over the pivot pin 68. A coil spring 76 has one end hooked onto the pawl 70 and its opposite end hooked onto an anchor pin 78 integral with the reel extension 50. A circular retainer plate 80 fits onto the extension 50 to enclose the pawl 70. The retainer plate 80 has apertures which fit over the pivot pin 68, the anchor pin 78, and a third mounting pin 82. The ends of these pins are heat staked. The retainer plate 80 is also retained by a pair of snap tabs 84 and 86 which are effective to retain the cover plate prior to the heat staking operation.

As best seen in FIGS. 2 and 3, the annular clutch member 60 is of molded plastic and has a plurality of circumferentially spaced ratchet teeth 88 on the inner periphery thereof and a like number of ratchet teeth 90 on the outer periphery thereof. A split clutch ring 92, best seen in FIGS. 2 and 3, surrounds the annular clutch member 60 and has opposed spring fingers 94 and 95 which seat into the ratchet teeth 90. The split clutch ring 92 also has an actuating arm 96 which extends downwardly into proximity with the lock bar 40 as best seen in FIG. 2. A tension spring 97 acts between the actuating arm 96 of the split clutch ring 92 and the side wall 14 to urge the clutch ring 92 and the annular clutch member 60 to the normal position of FIG. 2 in which the lock bar 40 is spaced away from the sprocket teeth 30.

Referring again to FIG. 2, in the event of rapid unwinding of the belt from the reel, the reel 24 is rotated in the counterclockwise direction of belt unwinding rotation and the extension 50 and the pawl 70 rotate in unison therewith while the annular clutch member 60 and split clutch ring 92 remain stationary. If the rate of belt unwinding acceleration exceeds a predetermined level, the inertia force acting on the pawl 70 causes the pawl 70 to fly radially outwardly as permitted by yielding of the spring 76 so that a tooth 100 of the pawl 70 engages one of the ratchet teeth 88 on the inner periphery of the annular clutch ring 60. Accordingly, the pawl 70 drive couples the reel shaft 34 to the annular clutch member 60 so that the unwinding rotation of the reel will rotate the annular clutch member 60 in the counterclockwise direction. The split clutch ring 92 is carried with the clutch member 60 in the counterclockwise direction so that the actuating arm 96 thereof engages and lifts the lock bar 40 into engagement with the sprocket teeth 30 of the reel 24 to lock the reel against any further belt unwinding rotation.

As best seen in FIG. 2, the full winding of the belt 29 on the reel 24 results in the diameter of the belt extending beyond the diameter of the toothed plate 28. Accordingly, if the occupant were to grab the belt and yank the belt rapidly, the pawl 70 would fly out and initiate rotation of the annular clutch member 60 and split clutch ring 92 to actuate the lock bar 40. However, the lock bar 40 cannot be lifted up to engage with the ratchet teeth because the several windings of the belt 29 block the lifting movement of the lock bar 40. Accordingly, the continued belt unwinding rotation of the reel will cause the annular clutch member 60 to continue rotating while the lock bar 40 prevents any further rotation of the split clutch ring 92. The split clutch ring 92 slips on the outer periphery of the annular clutch member 60 in controlled increments determined by the spacing of the ratchet teeth 90 on the outer periphery of the clutch member. As seen in FIG. 2, the sprocket teeth 30 on the toothed plate 28 are equal in number to the number of ratchet teeth 88 on the interior of the annular clutch member 60 and the number of teeth 90 on the exterior of the clutch member 60. After the belt unwinding rotation has progressed through several revolutions of the reel 24, the belt 29 will have been unwound from the reel sufficiently to unblock the lock bar 40 and enable its upward movement into engagement with the sprocket teeth 30 by the actuating arm 96 of the split clutch ring 92.

Thus, it is seen that the invention provides a new and improved belt rotation sensitive locking mechanism in which the acceleration sensor is friction drive coupled with the lock bar by an incremental stepping clutch which employs increments of clutching action equal in number to the number of ratchet teeth on the reel and the number of ratchet teeth in the pawl and clutch connection acting to actuate the lock bar so that the timing of the sensing mechanism is reliably maintained even after the clutch slips to retard the lockup of the reel until after the extent of belt winding has been sufficient to unblock the lock bar for locking engagement with the sprocket teeth of the reel.

The embodiments of the invention in which an exclusive property or privilege is claimed are defined as follows:

1. A seat belt retractor comprising:

a frame having spaced apart side walls;

a reel rotatably mounted on the side walls and having toothed plates disposed adjacent the side walls and having a belt wound thereon to a diameter greater than the diameter of teeth of the toothed plates;

a lock bar extending between the side walls and having a normal rest position spaced away from the toothed plates and being movable to a locking position engaging one of the teeth subsequent to the unwinding of sufficient belt from the reel to decrease the belt diameter to a diameter less than the diameter of the teeth;

a first clutch member mounted for rotary movement relative the reel and having a normal rest position, said first clutch member having means acting to move the lock bar into the engaged position upon said first clutch member rotation from the rest position in the belt unwinding direction of rotation;

a second clutch member having a plurality of circumferentially spaced inner teeth on the inner periphery thereof and an equal number of circumferentially spaced teeth on the outer periphery thereof;

pawl means carried by the reel and movable to selectively couple the reel with the second clutch member in response to a sensed rate of belt unwinding reel rotation so that the pawl rotates the second clutch member in the unwinding direction of rotation; and said first clutch member being a split clutch ring encircling the outer periphery of the second clutch member and having spring fingers engaging the outer teeth thereof to friction drive couple the split clutch ring with the second clutch member, said split clutch ring further having an actuating arm extending into actuating proximity with the lock bar whereby the lock bar is moved into engagement with the reel teeth to lock the reel against any further belt unwinding belt reel rotation in the event of occurrence of the sensed rate of belt unwinding reel rotation subsequent to the unwinding of sufficient belt from the reel to decrease the belt diameter to a diameter less than the diameter of the teeth of the toothed plates and the split clutch ring slips on the rotating second clutch member in incremental steps defined by the spacing of the outer teeth of the second clutch member in the event that occurrence of the sensed rate of belt unwinding occurs prior to the unwinding of sufficient belt from the reel to expose the teeth of the toothed plates for engagement by the lock bar.

* * * * *